US008892686B1

(12) United States Patent
Thibeault et al.

(10) Patent No.: US 8,892,686 B1
(45) Date of Patent: Nov. 18, 2014

(54) DYNAMIC CONTENT TRANSFORMATION FOR MULTIPLE DEVICES

(71) Applicant: Limelight Networks, Inc., Tempe, AZ (US)

(72) Inventors: Jason Thibeault, Gilbert, AZ (US); Peter Coppola, San Diego, CA (US); Rick Pugh, Chandler, AZ (US)

(73) Assignee: Limelight Networks, Inc., Tempe, AZ (US)

( * ) Notice: Subject to any disclaimer, the term of this patent is extended or adjusted under 35 U.S.C. 154(b) by 0 days.

(21) Appl. No.: 14/134,101

(22) Filed: Dec. 19, 2013

(51) Int. Cl.
G06F 15/16 (2006.01)
H04L 29/08 (2006.01)

(52) U.S. Cl.
CPC ................................ *H04L 67/06* (2013.01)
USPC ............................. 709/217; 709/219; 715/765

(58) Field of Classification Search
USPC .................... 709/217, 219; 715/765
See application file for complete search history.

(56) References Cited

U.S. PATENT DOCUMENTS

| 5,983,214 | A | 11/1999 | Lang et al. |
| 6,199,107 | B1 | 3/2001 | Dujari |
| 7,028,096 | B1 | 4/2006 | Lee |
| 8,463,876 | B2 | 6/2013 | Raciborski et al. |
| 2003/0195974 | A1 | 10/2003 | Ronning et al. |
| 2010/0005410 | A1* | 1/2010 | Pang ............................ 715/765 |
| 2010/0077056 | A1 | 3/2010 | Kokal et al. |
| 2012/0150993 | A1* | 6/2012 | Flack et al. ................... 709/217 |
| 2012/0166574 | A1 | 6/2012 | Harvell et al. |
| 2013/0031197 | A1* | 1/2013 | Delos Reyes et al. ........ 709/213 |
| 2013/0203433 | A1 | 8/2013 | Luna et al. |

FOREIGN PATENT DOCUMENTS

| WO | 2005015364 A2 | 2/2005 |
| WO | 2011126481 A1 | 10/2011 |

OTHER PUBLICATIONS

Jin, S. et al., "Accelerating Internet Streaming Media Delivery using Network-Aware Partial Caching", retrieved on Jan. 14, 2014 from http://www.cs.bu.edu/fac/best/res/papers/icdcs02.pdf, 2002, 8 pages, proceedings of the 22nd international conference on distributed computing systems.

Sivasubramanian, S. et al., "Replication for Web Hosting Systems", retrieved on Jan. 14, 2014 from http://dare.ubvu.vu.nl/bitstream/handle/1871/12852/acm-cs.04.pdf?sequence=1, 2004, 51 pages, Vrije Universiteit, Amsterdam, The Netherlands.

* cited by examiner

*Primary Examiner* — Kyung H Shin
(74) *Attorney, Agent, or Firm* — Kilpatrick Townsend & Stockton LLP

(57) ABSTRACT

A method for generating and delivering highlight versions of content for special case delivery through a Content Delivery Network (CDN) may include storing and distributing content in response to user requests using a plurality of edge servers, the plurality of edge servers being organized into a plurality of geographically distributed Points of Presence (POPs) in the CDN comprising a first POP that stores first content. The method may also include receiving a request for the first content and directing the request for the first content to the first POP. The method may additionally include automatically determining that the request for the first content originated from a mobile device and in response, providing a limited portion of the first content to the mobile device, wherein the limited portion of the first content comprises less than the first content.

12 Claims, 13 Drawing Sheets

DYNAMIC CONTENT TRANSFORMATION FOR MULTIPLE DEVICES

BACKGROUND OF THE INVENTION

A content delivery network (CDN) is a large distributed system of servers deployed in multiple data centers throughout the Internet. The goal of a CDN is to serve content to end-users with high availability and high performance. Besides better performance and availability, CDNs also offload the traffic served directly from the content provider's origin infrastructure. CDNs can include geographically distributed points of presence (POPs) to locate edge servers close to end users. CDNs are capable of delivering content in high demand with higher quality of service (QoS). Content can be requested from a CDN using a universal resource locator (URL). Various techniques are used to route a URL request to a nearby POP, for example, in order to efficiently retrieve content.

BRIEF SUMMARY OF THE INVENTION

In one embodiment, a method for generating and delivering highlight versions of content for special case delivery through a Content Delivery Network (CDN) may be presented. The method may include storing and distributing content in response to user requests using a plurality of edge servers. The plurality of edge servers may be organized into a plurality of geographically distributed Points of Presence (POPs) in the CDN. The plurality of geographically distributed POPs may include a first POP. The first POP may store first content. The method may also include receiving a request for the first content through a network interface that receives requests from user devices for content, and directing the request for the first content to the first POP. The method may additionally include automatically determining that the request for the first content originated from a mobile device. The method may further include in response to the determination that the request for the first content originated from the mobile device, providing a limited portion of the first content to the mobile device, wherein the limited portion of the first content comprises less than the first content.

In another embodiment, a system for generating and delivering highlight versions of content for special case delivery through a CDN may be presented. The system may include a plurality of edge servers that store and distribute content in response to user requests. The plurality of edge servers may be organized into a plurality of geographically distributed Points of Presence (POPs) in the CDN. The plurality of geographically distributed POPs may include a first POP. The first POP may store first content. The system may also include a network interface that receives requests from user devices for content, where a request for the first content may be received and directed to the first POP. The system may additionally include a processing function in the first POP configured to automatically determine that the request for the first content originated from a mobile device, and in response, provide a limited portion of the first content to the mobile device, wherein the limited portion of the first content comprises less than the first content.

BRIEF DESCRIPTION OF THE DRAWINGS

The subject matter that is regarded as the invention is particularly pointed out and distinctly claimed in the claims at the conclusion of the specification. The foregoing and other objects, features, and advantages will be apparent from the following detailed description taken in conjunction with the accompanying drawings.

DETAILED DESCRIPTION OF THE INVENTION

Figure 1:
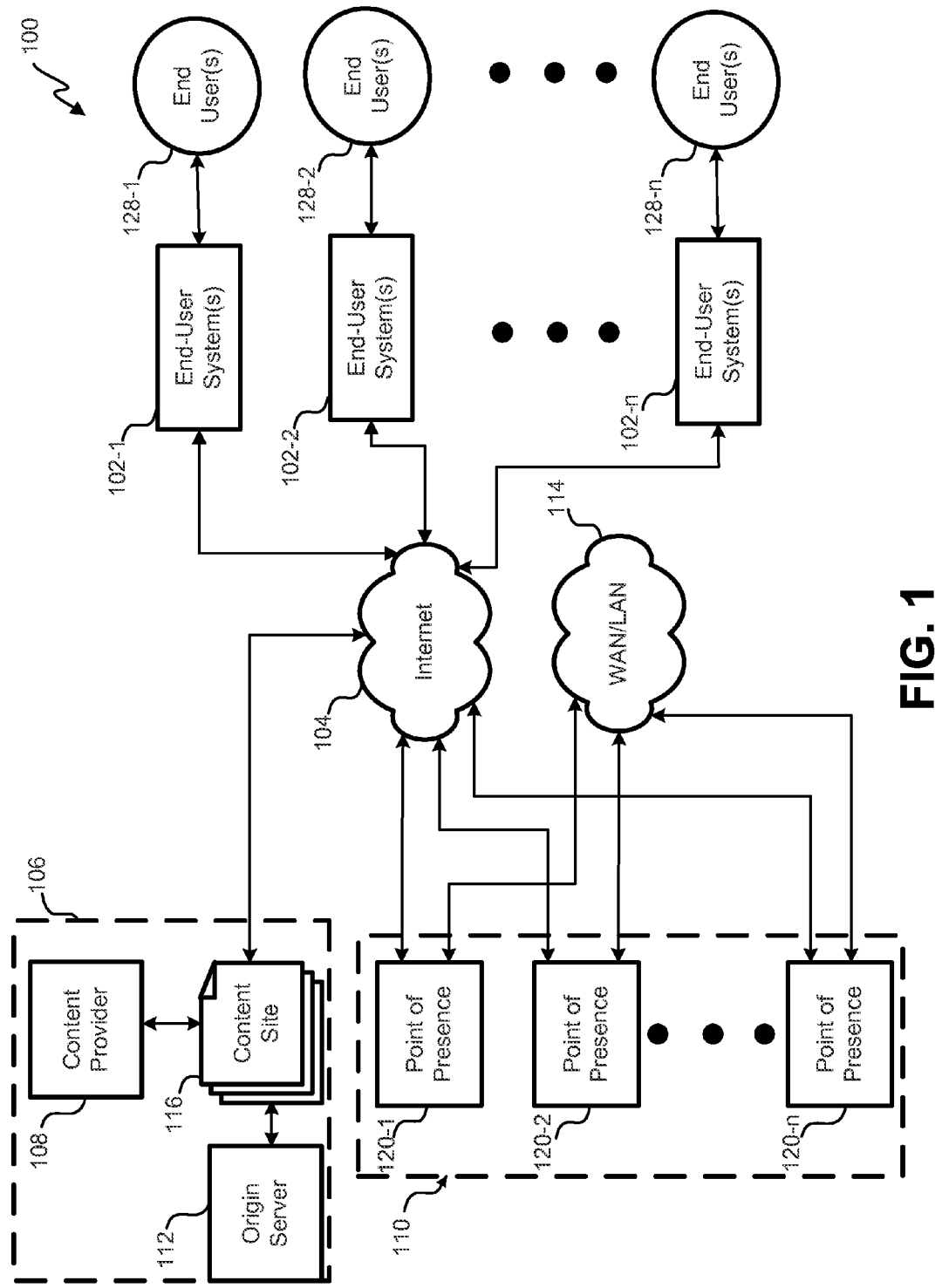
FIG. 1 illustrates a block diagram of a content distribution system, according to some embodiments.

The ensuing description provides descriptions of exemplary embodiments only, and is not intended to limit the scope, applicability, or configuration of the disclosure. Rather, the ensuing description of the exemplary embodiments will provide those skilled in the art with an enabling description for implementing the embodiments of the claims. It will be understood that various changes may be made in the function and arrangement of elements without departing from the spirit and scope as set forth in the appended claims.
Content Delivery Networks Referring first to FIG. 1, a block diagram of an embodiment of a content distribution system 100 is shown. The content originator 106 offloads delivery of the content objects to a content delivery network (CDN) 110. The content originator 106 produces and/or distributes content objects and includes a content provider 108, a content site 116, and an origin server 112. The CDN 110 can both cache and/or host content in various embodiments for third parties to offload delivery and typically provide better quality of service (QoS) to a broad spectrum of end-user systems 102 distributed geographically. The content originator 106 is the customer of the CDN 110 and an end user 128 benefits from improvements in QoS.

In this embodiment, the content distribution system 100 locates the content objects (or portions thereof) and distributes the content objects to an end-user system 102. The content objects are dynamically cached within the CDN 110 and/or hosted by the CDN 110. A content object is any content file, content stream, or a range defining a segment of a content file or content stream, and could include, for example, video, pictures, data, audio, software, and/or text. The content object could be live, delayed, or stored. The range defining a segment could be defined as a byte range or time range within the playback. Throughout the specification, references may be made to a content object, content, content stream and/or content file, but it is to be understood that those terms could be used interchangeably wherever they may appear.

Many content providers 108 use a CDN 110 (or multiple CDNs) to deliver the content objects over the Internet 104 to end users 128. The CDN 110 includes a number of points of presence (POPs) 120, which are geographically distributed through the content distribution system 100 to deliver content. Various embodiments may have any number of POPs 120 within the CDN 110 that are generally distributed in various locations around the Internet 104 so as to be proximate to end-user systems 102. Multiple POPs 120 use the same IP address such that an Anycast routing scheme is used to find a POP likely to be close to the end-user system 102, in a network sense, for each request. In addition to the Internet 104, a wide area network (WAN) and/or local area network (LAN) 114 or other backbone may couple the POPs 120 with each other and also couple the POPs 120 with other parts of the CDN 110. Distributed storage, processing, and caching is provided by the CDN 110.

When an end user 128 requests a web page (or other content) through its respective end-user system 102, the request for the web page is passed either directly or indirectly via the Internet 104 to the content originator 106. The content originator 106 is the source or re-distributor of content objects, i.e., the so-called origin server 112. The content site 116 is an Internet web site accessible by the end-user system 102. In one embodiment, the content site 116 could be a web site where the content is viewable with a web browser. In other embodiments, the content site 116 could be accessible with application software other than a web browser. The content provider 108 directs content requests to a CDN 110 after they are made or formulates the delivery path by embedding the delivery path into a uniform resource identifier (URI) for a web page. In any event, the request for content is handed over to the CDN 110 in this embodiment by using an Anycast IP address corresponding to two or more POPs 120. In some embodiments, the CDN 110 hosts content objects and/or web pages, thus acting as the origin server 112.

Once the request for a content object is passed to the CDN 110, the request is associated with a particular POP 120 within the CDN 110 using the Anycast routing scheme, but other embodiments could use routing, redirection, or DNS to shunt requests to a particular POP 120. It is noted that the CDN 110 processes requests for content in the application layer of the open systems interconnection (OSI) model with URIs, URLs, and HTTP. The particular POP 120 may retrieve the portion of the content object from the content provider 108, where the content originator 106 is hosting the origin server 112. Alternatively, the content provider 108 may directly provide the content object to the CDN 110 and POPs 120 associated with the CDN 110 through pre-population of caches (i.e., in advance of the first request) or hosting. A storage policy could be defined to specify the conditions under which pre-population is performed. In this embodiment, content objects are provided to the CDN 110 and stored in one or more CDN servers such that the portion of the requested content may be hosted from the CDN 110. The CDN servers include edge servers in each POP 120 that serve end-user requests. The origin server 112 holds a copy of each content object for the content originator 106. Periodically, the content of the origin server 112 may be reconciled with the CDN 110 through a caching, hosting, and/or pre-population algorithm, for example, through a storage policy. Some content providers 108 could use an origin server 112 within the CDN 110 to host the content and avoid the need to maintain a copy.

Once the content object is retrieved, the content object is stored within the particular POP 120 and is served from that POP to the end-user system 102. The end-user system 102 receives the content object and processes the content object for use by the end user 128. The end-user system 102 could be a personal computer, media player, handheld computer, tablet, pad, Internet appliance, phone, smart phone, IPTV set top, streaming radio, or any other device that receives and plays content objects. In some embodiments, a number of the end-user systems 102 could be networked together. Although this embodiment shows only a single content originator 106 and a single CDN 110, it is to be understood that there could be many of each in various embodiments.

Figure 2:
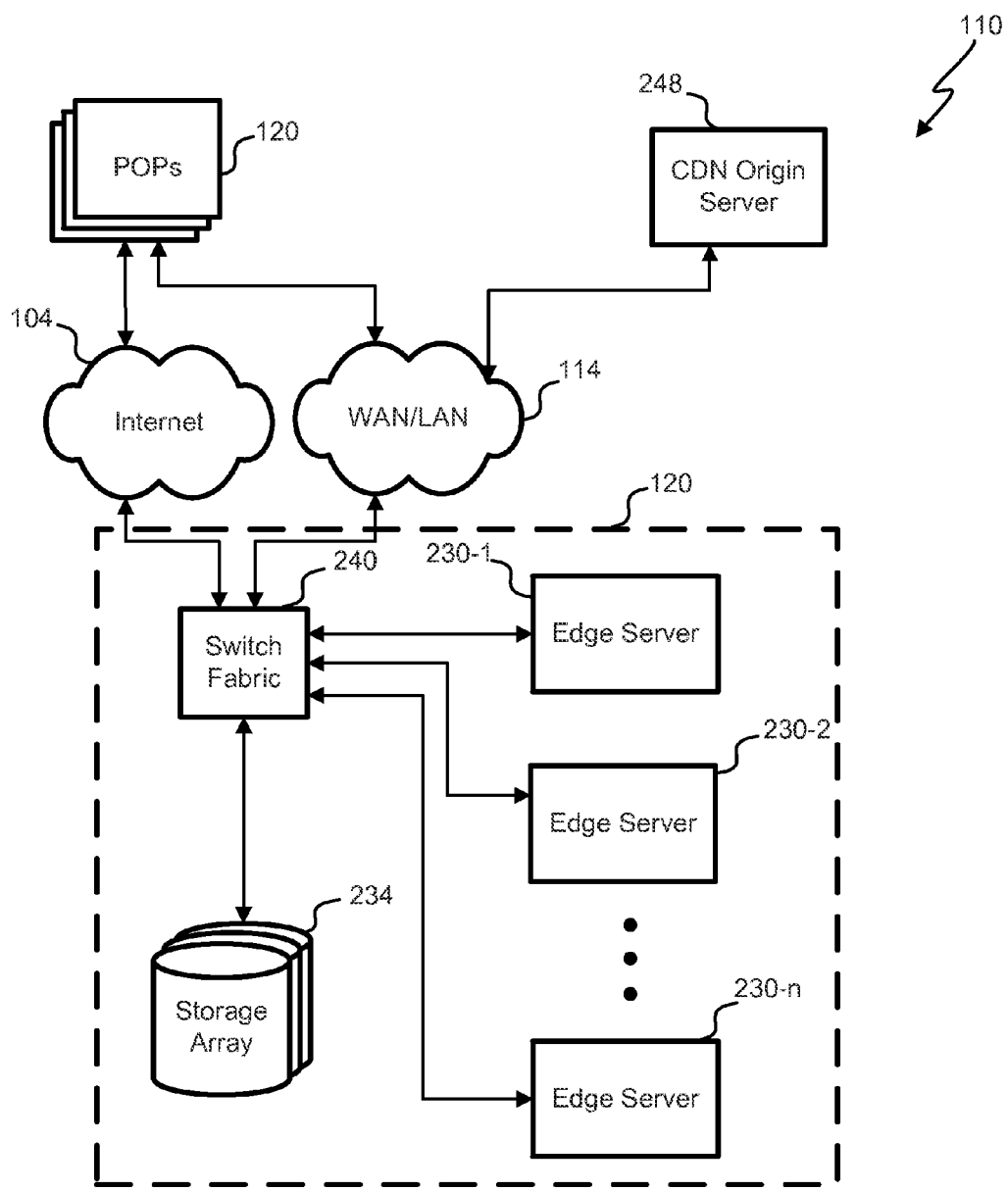
FIG. 2 illustrates a block diagram of an embodiment of a content delivery network (CDN), according to some embodiments.

With reference to FIG. 2, a block diagram of an embodiment of a CDN 110 is shown. Although only one POP 120 is shown in detail, there are a number of POPs 120 similarly configured throughout the CDN 110. The POPs 120 communicate through a WAN/LAN 114 and/or the Internet 104 when locating content objects. An interface from the Internet 104 to the POP 120 accepts requests for content objects from end-user systems 102. The requests come from an Internet protocol (IP) address of the end-user system 102 in the form of a URI that causes an HTTP get command. The requests for content files from the CDN 110 pass through the application layer.

Switch fabric 240 assigns the request to one of the edge servers 230 according to a routing scheme such as round robin, load balancing, etc. In some embodiments, the switch fabric 240 is aware of which edge servers 230 have what capabilities and assigns requests within the group having the capability to store and serve the particular content object referenced in the URI. Edge servers 230 gathered in a particular group as neighbors can be grouped with other servers in the current POP 120, less loaded servers in the current POP 120, servers having a capability to process the content object, a subset of servers assigned to a customer using the CDN 110 to serve the content object, or some other grouping of servers in the POP 120.

In some cases, the CDN 110 is used to host content for others. Content providers 108 upload content to a CDN origin server 248. Although only one CDN origin server 248 is shown, it is to be understood that there could be many spread among a number of locations and/or POPs 120. The content object can be stored in the CDN origin server 248. The CDN origin server 248 serves the content object within the CDN 110 to various edge servers 230 in various POPs 120. After the content provider 108 places a content object on the CDN origin server 248 the content object need not be hosted on an origin server 112 of the content originator 106 redundantly. Although shown separately, it is to be understood that the CDN origin sever 248 could be integral to an edge server 230.

Some embodiments include an optional storage array 234 in the POP 120 or elsewhere in the CDN 110. The storage array 234 can provide hosting, storage, and/or caching. Edge servers 230 can revert to the storage array 234 for certain content, for example, very large files or infrequently requested files. Flushing of a cache of an edge server 230 could move the content to the storage array 234 until it is ultimately flushed from the storage array 234 after which subsequent requests would be fulfilled by an origin server 112 to repopulate cache in the POP 120.

Requests from end-user systems 102 are assigned to an edge server 230 that may cache, store, or host the requested content object. At times, the edge server 230 receiving a request does not have the content object stored for immediate serving. This so-called "cache miss" triggers a process within the CDN 110 to find the content object (or portion thereof). The content may be found in neighboring edge servers 230 in the same POP 120, in another POP 120, in a CDN origin server 248, in a POP storage array 234, or even an origin server 112 external to the CDN 110. The various edge servers 230 and CDN origin servers 248 are grouped for various URIs uniquely. In other words, one URI may look to one group of servers 230, 248 on a cache miss while another URI will look to a different group of servers 230, 248.

Figure 3:
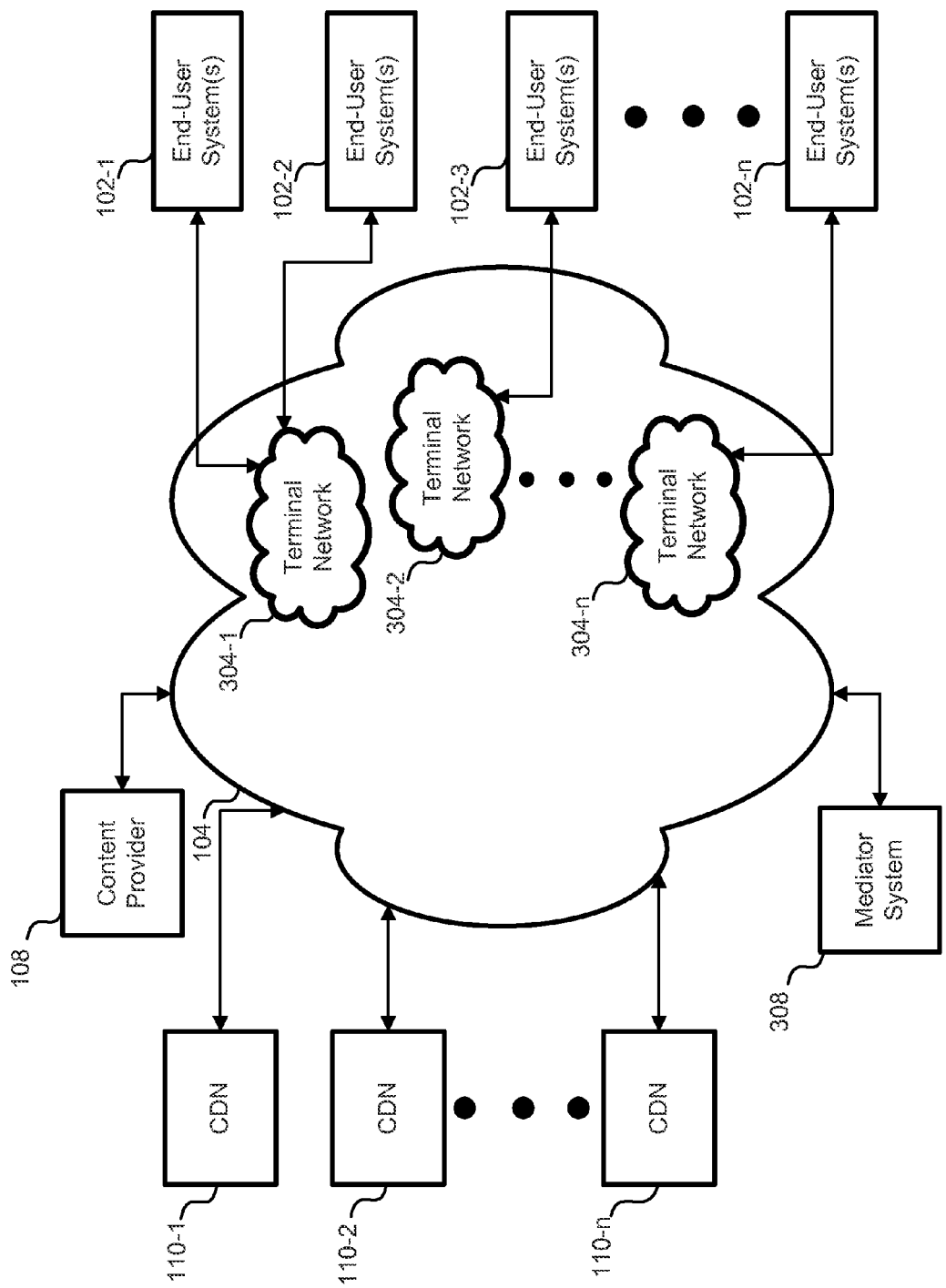
FIG. 3 illustrates a block diagram of another embodiment of a content distribution system, according to some embodiments.

Referring next to FIG. 3, an embodiment of a cooperative delivery system is shown. A content provider 108 is connected to the Internet 104. Also connected to the Internet 104 are a plurality of CDNs 110 and a plurality of end-user systems 102. As part of the Internet 104, a plurality of terminal networks 304 provide internet service to the plurality of end-user systems 102. In some embodiments, terminal networks 304 are "last mile" networks providing telecommunications, cable television, and/or Internet services to end users 128. Some examples of terminal networks 304 include CenturyLink, Comcast, Verizon, and AT&T. In some embodiments, terminal networks 304 include peer networks. In some embodiments, terminal networks 304 have caches to store content objects. Caches of the terminal networks 304 can be a single cache, or spread out among a plurality of caches similar to a CDN 110 with a plurality of POPs 120. Some terminal networks 304 function as a content delivery network 110.

In this embodiment, the content provider 108 contracts with a first CDN 110-1 for delivery of a content object to end-user systems 102. Though only one content provider 108 is shown, there may be many content providers 108 contracting with CDNs 110 and/or terminal networks 304 for delivery of a plurality of content objects. Also, an origin server 112 having the content object can be external to the CDN 110 or internal to the CDN 110, such as in a CDN origin server 248. In some embodiments, the first CDN 110-1 subcontracts delivery of the content object to a second CDN 110-2 and/or terminal network 304 for delivery to an end-user system 102. The first CDN 110-1 may subcontract delivery of the content object for various reasons. For example, the second CDN 110-2 may have a better coverage of POPs 120 in a given geographic area. The first CDN 110-1 may have several POPs 120 in North America and Europe, but not South America. The second CDN 110-2 may have several POPs 120 in South America. To deliver the content object to an end user 128 in South America, the first CDN 110-1 subcontracts delivery of the content object to the second CDN 110-2. In another example, the second CDN 110-2 also has POPs 120 in Europe. When POPs 120 of the first CDN 110-1 in Europe become overloaded, the first CDN 110-1 has the second CDN 110-2 deliver the content object in Europe.

In some embodiments, the first CDN 110-1 subcontracts delivery of the content object with terminal networks 304. For example, the first terminal network 304-1 caches the content object when delivering the content object to a first end-user system 102-1. When a second end-user system 102-2 requests the content object, the first terminal network 304-1 serves the content object from a cache of the first terminal network 304-1.

In some embodiments, a mediator system 308 is also connected to the Internet 104. The mediator system 308 serves several functions for the cooperative delivery system, such as assignment, accounting, and control. In some embodiments, the mediator system 308 receives requests for delivery of the content object and assigns a CDN 110 or a terminal network 304 to deliver the content object. The mediator system 308 chooses a CDN 110 or terminal network 304 based on geography, latency in a network, delivery cost, quality of service, etc. In some embodiments, the mediator system 308 contracts with the content provider 108 for delivery of the content object instead of the first CDN 110-1 contracting with the content provider 108 for delivery of the content object. In some embodiments, the mediator system 308 is part of, and/or controlled by, a CDN 110 or terminal network 304. Also, a cooperative delivery system may comprise two or more mediator systems 308, and each mediator systems 308 is tied to a particular CDN 110.

In some embodiments, the mediator system 308 accounts for content delivery. After assigning delivery of the content object to a CDN 110 or terminal network 304, the mediator system 308 credits that network with delivery of the content object. In other embodiments, the mediator system 308 receives reports about delivery of the content object before crediting the CDN 110 or terminal network 304 for delivery.

In some embodiments, the mediator system 308 also establishes control parameters for delivery of the content object. For example, the content provider 108 sets a minimum quality of service threshold for delivering the content object. When assigning delivery of the content object, the mediator system 308 passes variables specifying the control parameters to the CDN 110 and/or terminal network 304 delivering the content object.

Dynamic Content Transformation by Device Type

Embodiments described herein provide for methods of efficiently delivering content to various device types. A content delivery network (CDN) can detect a device type and distinguish between a first class of devices that can readily receive full content objects and a second class of devices that would more efficiently receive a limited portion of a content object. By way of example, mobile devices may communicate through bandwidth-limited networks, which may limit the amount of data that can be efficiently transferred in short time intervals. A CDN can generate a limited portion of the content that includes "highlight" portions that can be delivered to the mobile device. Optionally, a link may be provided such that the mobile device can request the full portion of the content. The limited portion of the content can be pre-generated or generated on-the-fly, and can be specified by a content provider or generated automatically by the content delivery network based on various metrics. Additionally, the limited portion of the content object can be sourced from partial content objects in various POPs throughout the CDN.

Figure 4:
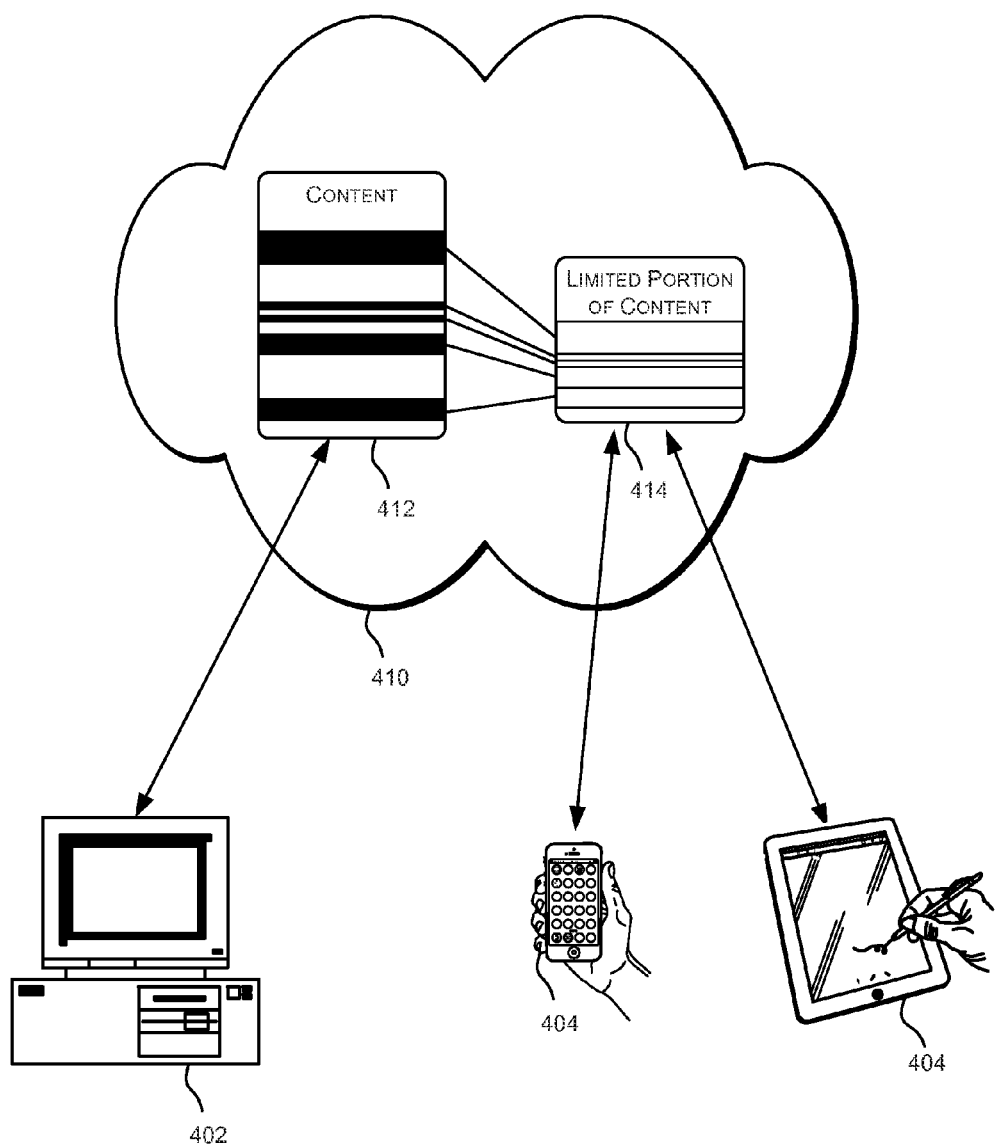
FIG. 4 illustrates a block diagram of a content request serviced by a single point of presence (POP), according to some embodiments.

FIG. 4 illustrates a block diagram of a content request serviced by a single point of presence (POP), according to some embodiments. Different types of devices will generally request content through a CDN. A content request may be received by a POP 410. If the POP 410 can source the content, it will be delivered to the requesting device. If the POP 410 cannot source some portion of the content, that portion can be requested from other nearby POPs or from an origin server.

Devices requesting content from the POP 410 may include a first class of devices 402 that can readily receive full content objects. For example, the first class of devices 402 may include desktop computers, laptop computers, workstations, servers, and/or the like. The first class of devices 402 may be designated by a device type, CPU processing metrics, an amount of available memory, a screen size, and/or the like. In some embodiments, the first class of devices 402 may also be characterized by a location or a metric describing their portability. For example, the first class of devices 402 may include computing devices that are stationary or constantly connected to a single network, or are accessed through a static IP address. The first class of devices 402 may also be characterized by devices that are connected to the POP 410 through a high-bandwidth communication link. For example, the POP 410 can receive metrics from either a service provider network or from the device itself and determine a connection speed. Fast connections, such as T1 connections, broadband connections, fast DSL connections, and/or the like, can be connected to the first class of devices 402. In some embodiments, the first class of devices 402 may be characterized by a type of owner. For example, the first class of devices 402 may include devices accessed by a business or corporate account. The first class of devices 402 may include devices accessed through a particular subscriber level. For example, users subscribing to a high level of service may have their devices classified in the first class of devices 402. In some embodiments, the first class of devices 402 may include computing devices connected through landline networks, DSL networks, or other stationary device networks that can be distinguished from mobile device networks.

Devices requesting content from the POP 410 may also include a second class of devices 404 for which it may be more efficient to deliver only a limited portion of the content object. The second class of devices 404 may include mobile devices, smart phones, cell phones, PDAs, tablet computing devices, pagers, digital book readers, and/or the like. The second class of devices 404 may generally have CPU processing power, memory, and/or screen sizes that are less than or smaller than the first class of devices 402. In some embodiments, the second class of devices 404 may be classified as devices that are excluded from the first class of devices 402. In some embodiments, the second class of devices 404 may be characterized by communication through a mobile device network, a dynamic IP address, connections through multiple networks, or connections through relatively slower networks in comparison to the first class of devices 402. In some embodiments, the second class of devices 404 may be characterized by a type of owner or subscription level. For example, in contrast to the subscription level for the first class of devices 402, the second class of devices 404 may subscribe to a lower or cheaper level of service from the CDN.

In order to simplify the description of various embodiments, the first class of devices 402 may be represented herein by non-mobile devices. In contrast, the second class of devices 404 may be represented herein by mobile devices, such as smart phones or tablet computers. However, non-mobile devices and mobile devices are merely exemplary, and not meant to be limiting. Any discussion that pertains to a mobile device is also intended to apply to any member of the second class of devices 404 described above. Similarly, any discussion that pertains to a non-mobile device is also intended to apply to any member of the second class of devices 402 described above.

When receiving a request for a content object 412, the POP 410 can first determine whether the object belongs to the first class of devices 402 or the second class of devices 404, e.g. whether the request originates from a non-mobile device or from a mobile device. Detecting the device type can be accomplished in a number of different ways. The POP 410 can query the requesting device and receive a characterizing metric. The POP 410 can automatically detect connection speeds or networks through which the requesting device is communicating. The POP 410 can receive information characterizing the device as part of the request. For example, some requests will include an HTML attribute that identifies the requesting device, requesting network, and/or the like. In some embodiments, the CDN can access client profiles to determine a subscription level or registered device types in order to characterize the requesting device. Additionally, the CDN can automatically detect a quality of service (QoS) as content is being delivered, and reclassify the device in real time. For example, if the requesting device is struggling to receive the content object 412, the POP 410 can reclassify the device as one of the second class of devices 404 and instead deliver a limited portion of the content object 414.

A device belonging to the first class of devices 402 can be delivered the full content object 412. For devices belonging to the second class of devices 404, the POP 410 can instead generate and/or send the limited portion of the content object 414. The limited portion of the content object 414 can be distinguished from the content object 412 in that blocks, chunks, or contiguous time slices of the content object 412 can be extracted from the content object 412 and concatenated together to form the limited portion of the content object 414. The limited portion of the content object 414 can be distinguished from different transcodings of the content object 412 or different bit rate deliveries of the content object 412. Instead, the limited portion of the content object 414 represents a set of highlights extracted from the content object 412. By way of example, a limited portion of a video clip would include a plurality of other scenes extracted from the original video clip and spliced together.

The POP 410 can generate the limited portion of the content object 414 a priori, or prior to receiving a request. This can allow the POP 410 to immediately provide the limited portion of the content object 414 to the requesting device upon receipt of the request. Alternatively, the POP 410 can generate the limited portion of the content object 414 on-the-fly in response to a request. When receiving a request, the POP 410 can analyze the content object 412 or metadata associated with the content object 412 and immediately generate the limited portion of the content object 414.

The POP 410 can also choose to store the limited portion of the content object 414 in an edge server as an individually-cached object. For example, highlight portions of the content object 412 can be extracted or copied from the content object 412, and these copies can be spliced together and saved separately in a file as the limited portion of the content object 414. Thus, the limited portion of the content object 414 can be proliferated throughout the cache in response to requests from other POPs. In one example, a user device can request the limited portion of the content 414 generated in the POP 410 from a second POP (not shown). A copy of the limited portion of the content object 414 can then be sent to respond to the cache miss in the second POP and store a copy of the limited portion of the content object 414 in the second POP. As with any other cached object, copies of the limited portion of the content object 414 may exist throughout the CDN in various POPs based on usage, customer policies, client requests, and/or the like.

In some embodiments, instead of storing the limited portion of the content 414 as a new object, the limited portion of the content 414 may be designated as certain portions of the content object 412. For example, the limited portion of the content 414 may be represented in the POP 410 by a metadata file that identifies the sections of the content object 412 that are used to construct the limited portion of the content object 414. For a video, the limited portion of the content object 414 may be represented by a list of start and stop times in the video and how the individual clips should be ordered (e.g. 0:28-1:10, 3:14-3:38, 4:21-4:28, . . . ). The information designating the sections of the content object 412 can be stored as metadata along with the content object 412. Alternatively, this information can be stored as a separate content object and proliferated throughout the CDN as described above. This information can be transferred as a cache object to other POPs in response to cache misses and the information can then be used to generate the limited portion of the content 414 for delivery in other POPs.

Different embodiments may use one or more ways to determine which sections of the content object 412 should be used to form the limited portion of the content object 414. In some embodiments, the sections of the content object 412 may be designated by a customer or content owner. A customer may designate sections for a single content object, for a class of content objects, or for all content objects provided by the customer. The content object 412 may be processed and the limited portion of the content object 414 may be generated according to policies stored by the CDN that govern how different content objects are distributed throughout the CDN. A full description of how content objects can be governed within the CDN according to customer policies is described in the co-owned U.S. App. No. 14/134,037 entitled "Content Delivery Architecture for Controlling a Digital Presence," filed on the same date as this application and incorporated herein by reference for all purposes.

In some embodiments, the sections of the content object 412 that are used to form the limited portion of the content object 414 may be based on client device preferences. The CDN may access a user profile and select sections of the content object 412 that users of the particular client device have requested. For example, a user may be identified by a login, password, IP address, a device ID, and/or the like. The CDN uses this information to access a stored profile where the particular user can indicate the most desirable sections of the content object 412.

Some embodiments may automatically select sections of the content object 412 based on characteristics of the content object 412. For example, for video clips, the CDN can analyze the video and determine sections of the video that include the most motion, highest volume, most color change, and/or the like that would signify a section of the video that may be of user interest. For audio clips, the CDN can select sections that include the loudest intensity, fastest beat, most different sound sources (i.e. most instruments playing), and/or the like. In another example, the CDN can analyze the content object 412 and determine portions of the content object where users were most likely to provide feedback, such as responses on social media networks or comment sections. If a certain section in the middle of the video was accompanied by frequent Tweets or posts, this section can be identified as one to be included in the limited portion of the content object 414.

Some embodiments may automatically select sections of the content object 412 based on popularity. The CDN can store information that indicates portions of the content object 412 that are most watched, played, re-watched, and/or requested by users over time. For example, if users routinely watch the first 10 seconds of a video, then skip to a middle section of the video, the limited portion of the content 414 can be constructed using the first 10 seconds of the video and the middle section of the video that were most watched.

The limited portion of the content object 414 may change dynamically over time, particularly when the limited portion of the content object 414 is generated based on popularity, user preferences, user inputs or reactions, or other metrics that change over time. As these metrics are continuously collected by the CDN, the limited portion of the content 414 may also change in response in order to provide the most relevant sections of the content object 412 to requesting devices.

Figure 5:
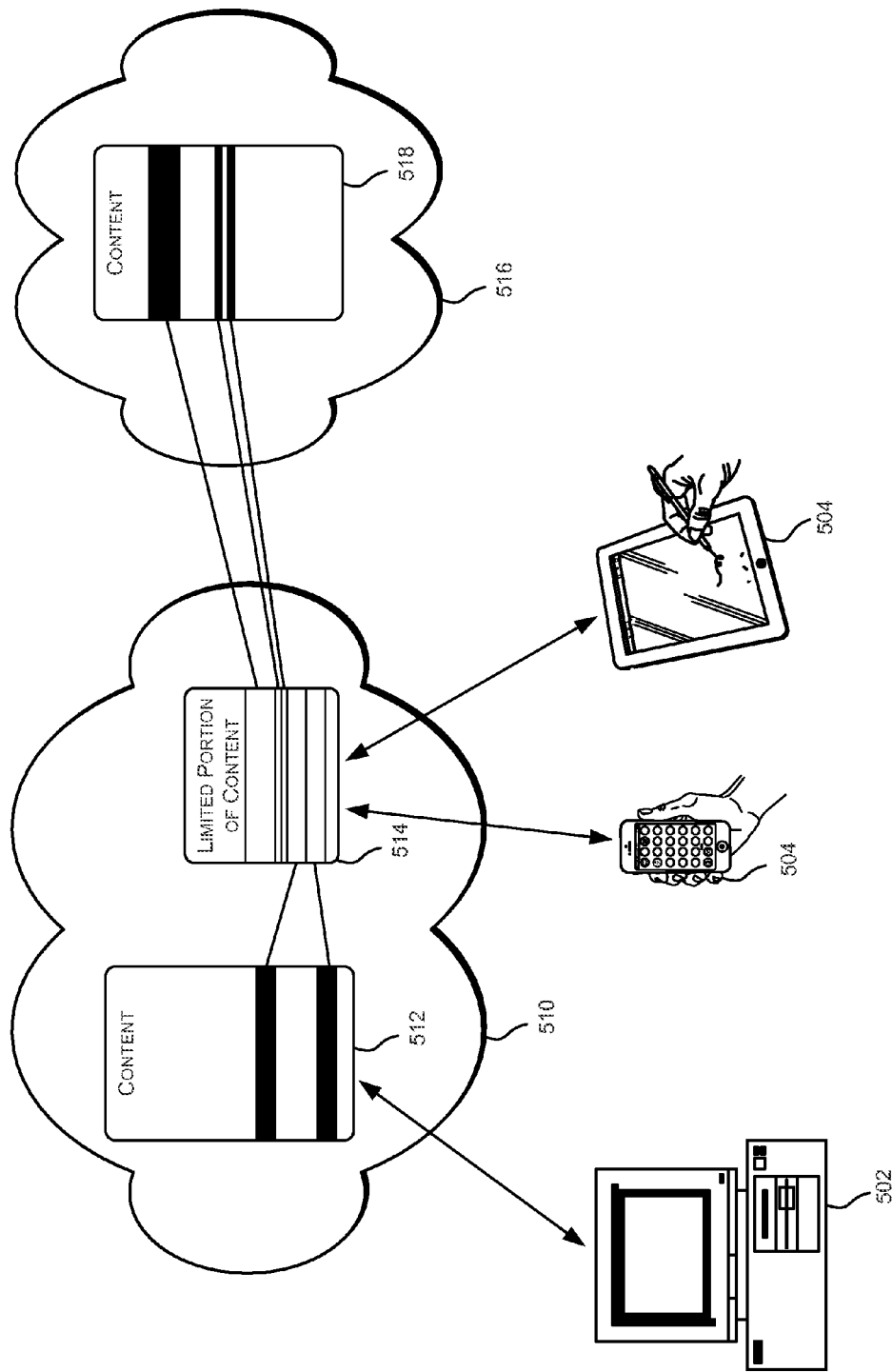
FIG. 5 illustrates a block diagram of a content request serviced by a multiple POPs, according to some embodiments.

FIG. 5 illustrates a block diagram of a content request serviced by a multiple POPs, according to some embodiments. In this embodiment, the requesting device may request a content object 512 that resides in multiple POPs, such as a first POP 510 and a second POP 516. The first class of devices 502, such as high-speed landline devices, desktop computers, and/or the like can receive the content object 512 from the first POP 510. The second class of devices 504 may receive a limited portion of the content object 514. In contrast to the embodiment of FIG. 4, the limited portion of the content object 514 may be constructed using sections of the content object 512 from cached copies in multiple POPs.

In this case, the content object 512 in the first POP 510 may be cached throughout the CDN, resulting in a copy of the content object 518 in the second POP 516. The limited portion of the content object 514 may be constructed using sections from the content object 512 in the first POP 510 as well as sections of the copy of the content object 518 in the second POP 516. In some cases, the limited portion of the content object 514 can copy sections from both the content object 512 and the copy of the content object 518 in order to construct and store the limited portion of the content object 514. In other cases, the limited portion of the content object 514 can retrieve sections from both the content object 512 and the copy of the content object 518 on-the-fly in response to the request. For example, in the case of a video, the first half of the content object 512 can be streamed to another requesting device when the request for the content object 512 is received from one of the first class of devices 504. In this case, sections from the second half of the content object 512 could be used to construct the limited portion of the content object 514, and the remaining sections could be sourced from the copy of the content object 518 in the second POP 516.

In some cases, the CDN can cache partial objects. Objects within the CDN can be divided into smaller chunks that can be dispersed throughout the CDN and transferred on demand to a requesting device through the first POP 510. For example, the first 10 seconds of a video clip may be in more demand than the last 3 minutes of the video clip. Therefore, a chunk of the content object 512 representing the first 10 seconds of a video clip may be dispersed more widely throughout the CDN than chunks representing the remaining sections of the video clip.

Although not shown explicitly, the content object 512 may represent a partial object, and a copy of the content object 518 may also represent a partial object. In a partial-object-caching scheme, the content object 512 in the first POP 510 may represent a first chunk of, for example, a video clip. Similarly, the copy of the content object 518 in the second POP 516 may represent a second chunk of the video clip. The limited portion of the content object 514 can be sourced from these partial object chunks in both the first POP 510 and the second POP 516.

Figure 6:
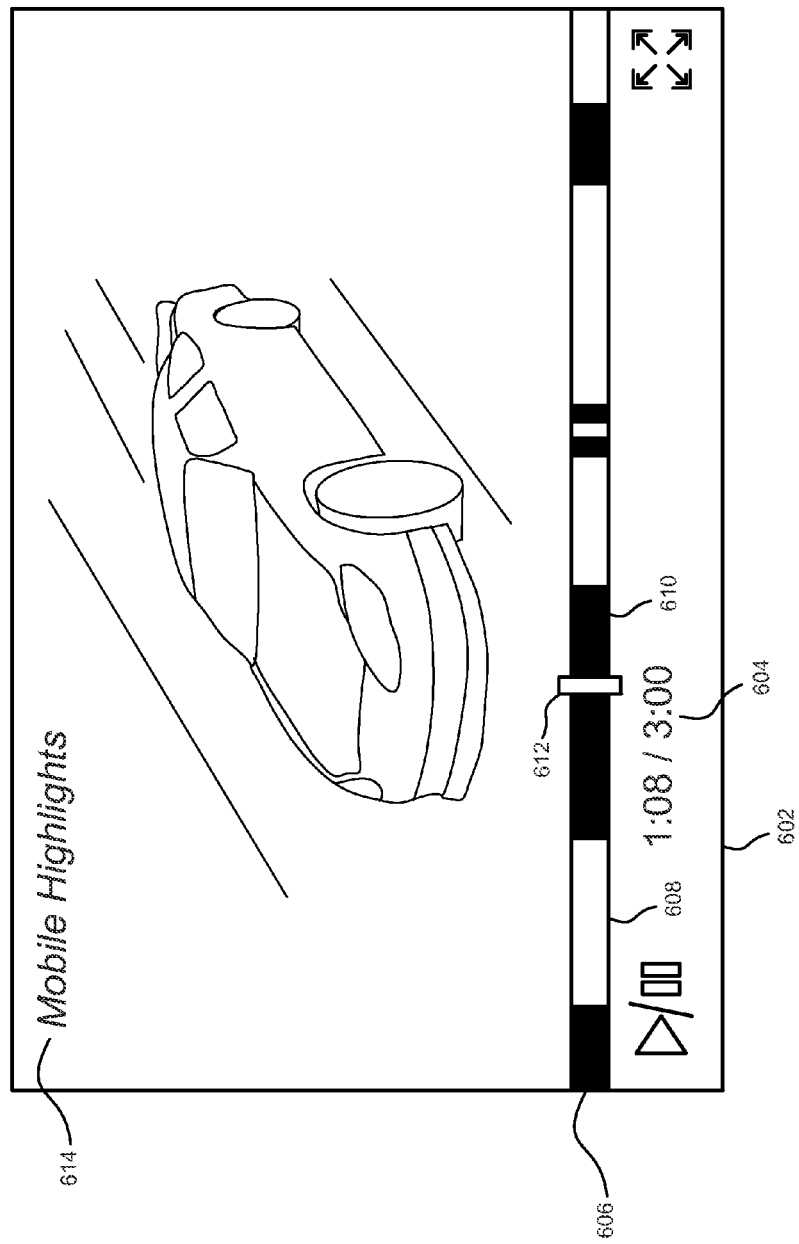
FIG. 6 illustrates a diagram of a content player presenting a limited portion of content, according to some embodiments.

FIG. 6 illustrates a diagram of a content player presenting a limited portion of content, according to some embodiments. By way of example, FIG. 6 illustrates a content object that represents a video clip that can be played in a video player 602. Note that many video players are widely available and known to those having skill in the art, thus video player 602 is merely exemplary and not meant to be limiting. When the video player 602 is played by, for example, a mobile device, the limited portion of the content object may be downloaded or streamed to the device for the video player 602. Generically, the video player 602 may also be referred to as a content player or another type of player depending on the content type (e.g. a music player).

An indication 614 may be displayed as the content is played in the video player 602. The indication 614 may be a textual indication alerting a viewer to the fact that the content they are watching represents a limited portion of the content. For example, the indication 614 may describe the limited portion of the content as a "highlight" clip. The indication 614 may also indicate that the limited portion of the content is being displayed because of the device class of the requesting device (e.g. a mobile device, a device connecting through a low-bandwidth connection, etc.).

In some embodiments, the limited portion of the content may be represented in the content player explicitly as highlights of the full content object. In the embodiment of FIG. 6, a time bar 606 may display a timescale corresponding to the full content object. However, certain sections 610 of the time bar 606 may be highlighted, activated, or otherwise represented to a viewer to indicate that only the limited portion of the content is playing. As a current time indicator 612 moves through the time bar 606, it will skip to each of the sections 610 to visually indicate which portions of the content are represented by the limited portion of the content being played. A timer 604 may skip along with the current time indicator 612 relative to the total time of the content object.

Figure 7:
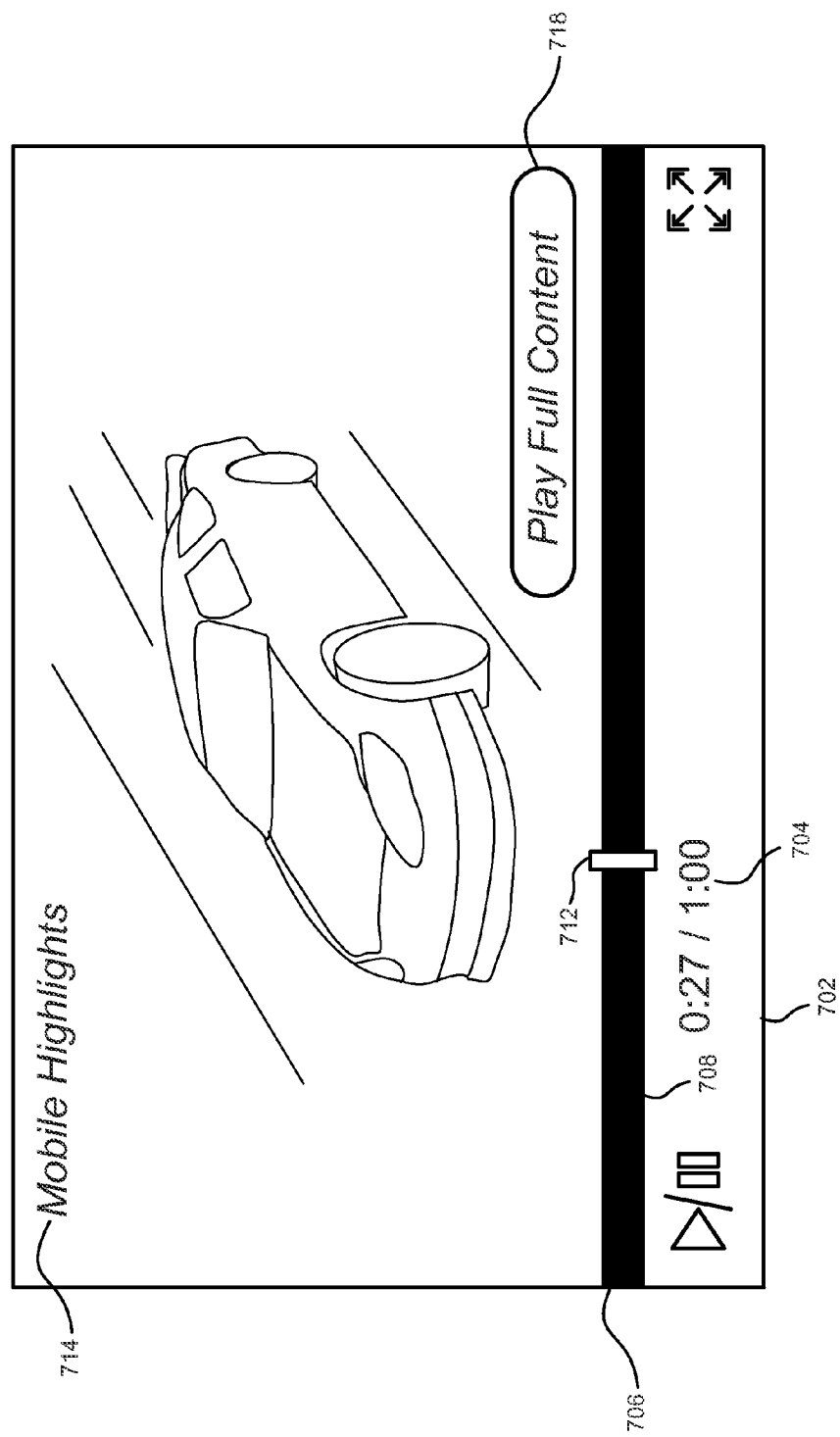
FIG. 7 illustrates a diagram of a content player presenting a limited portion of content, according to some embodiments.

FIG. 7 illustrates a diagram of a content player presenting a limited portion of content, according to some embodiments. A content player 702 may be very similar to the content player 602 of FIG. 6, the difference being that in this case the limited portion of the content object is displayed or played as though it were a complete content object. Instead of displaying the discrete sections of time that are part of the limited portion of the content object and the other discrete sections of time that are only part of the content object, a time bar 706 may display a single section 708 that provides the appearance of a single contiguous content object. An indication 714 can still be displayed indicating that the content being played represents the limited portion of the content object; however, the timer 704 and the time bar 706 will function as though a single contiguous object was being played rather than a collection of highlight sections.

In some embodiments, a link 718 may be provided as part of the playback of the limited portion of the content object in the video player 702. The link 718 can be displayed throughout the playback of the limited portion of the content object. Alternatively, the link 718 can be displayed towards the end of the playback of the limited portion of the content object. In some embodiments, the link 718 can be displayed periodically at the beginning or end of each highlight section that makes up the limited portion of the content object. In other words, if five highlight sections are concatenated to form the limited portion of the content object, then as the playback transitions between each of the five highlight sections, the link 718 may be displayed momentarily.

When an input is received by the requesting device selecting the link 718, the full content object can be requested from the CDN. In some cases, the entire content object can be transmitted or streamed to the requesting device. In other cases, only the sections of the content object that are not represented by the limited portion of the content object need to be transmitted to the requesting device. This may prevent needlessly retransmitting sections of the content object that are already buffered or cached on the requesting device.

Figure 8:
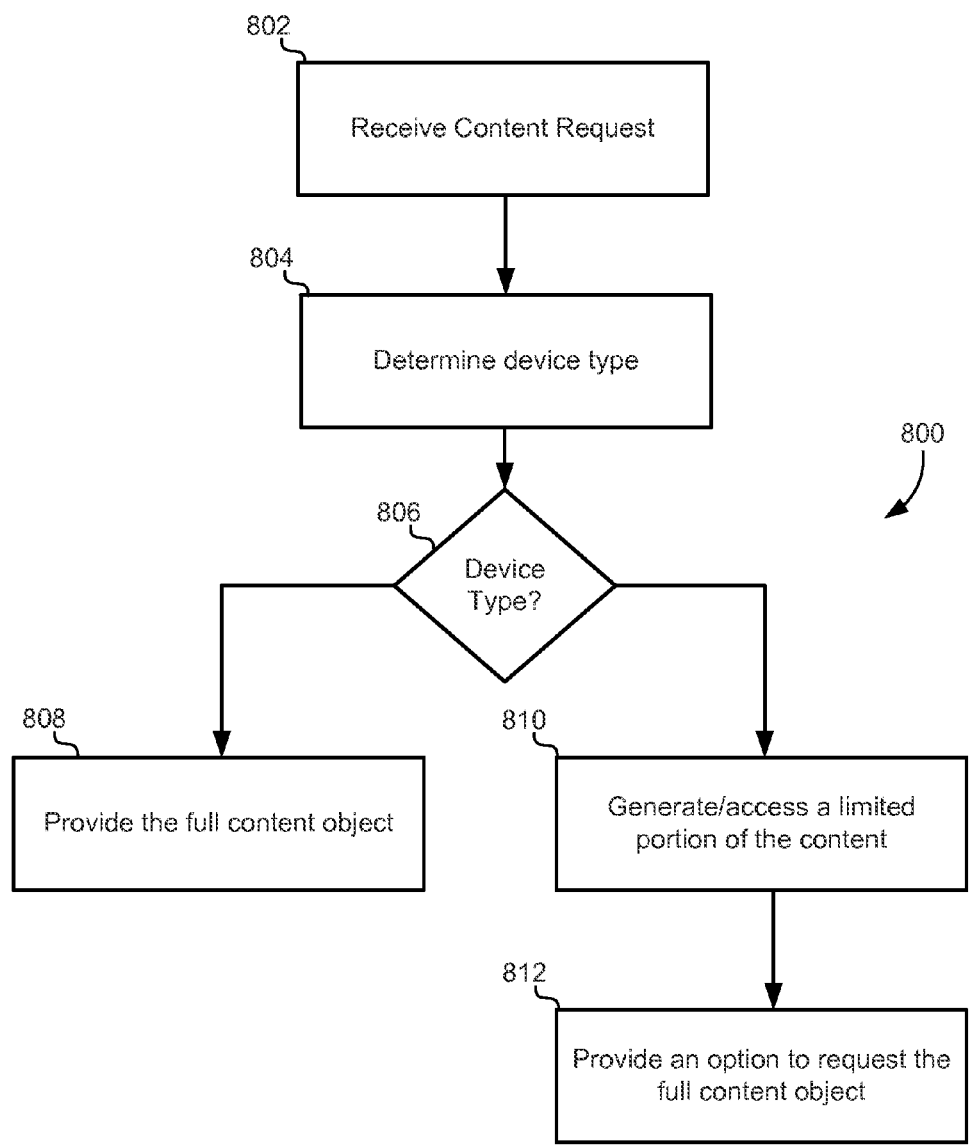
FIG. 8 illustrates a flowchart of a method for generating and delivering highlight versions of content for special case delivery through a CDN, according to some embodiments.

FIG. 8 illustrates a flowchart 800 of a method for generating and delivering highlight versions of content for special case delivery through a CDN, according to some embodiments. This method represents a general framework for creating, selecting, and distributing limited portions of content objects as described above. In the ensuing description of this method, any of the embodiments or features described above may be inserted within this method in any order.

The method may include receiving a content request (802). For example, a CDN may receive a request from a client device for a content object. The request may be facilitated by a first POP that routes the request based on load balancing, latency, geographic proximity, and/or the like. The method may also include determining a device type or class (804). For example, the CDN can detect a device type based on stored profiles, IP addresses, interactions with the requesting device, diagnostic latency measurements, an analysis of the request itself, characteristics of an ISP or network through which the device is connecting, and/or the like. In some embodiments, the device can be classified as either the first device type or second device type as described above.

The method may further include determining whether the full content object should be delivered to the device based on the determined device type (806). For devices of the first type (e.g. non-mobile devices) the full content object can be delivered (808). For devices of the second type (e.g. mobile devices) the limited portion of the content object can be generated and/or accessed as described above (810). Optionally, the limited portion of the content can be provided along with an option to request the full content object (812). This option may be provided in the form of a link or other input method through which the requesting device can send an indication to the CDN.

It should be appreciated that the specific steps illustrated in FIG. 8 provide particular methods of utilizing a limited portion of a content object according to various embodiments. Other sequences of steps may also be performed according to alternative embodiments. For example, alternative embodiments of the present invention may perform the steps outlined above in a different order. Moreover, the individual steps illustrated in FIG. 8 may include multiple sub-steps that may be performed in various sequences as appropriate to the individual step. Furthermore, additional steps may be added or removed depending on the particular applications. One of ordinary skill in the art would recognize many variations, modifications, and alternatives.

Requesting System Profiles for Content Delivery

As described above, different device types can benefit from receiving different types of content. Additionally, the CDN itself as well as the customer whose content is been distributed by the CDN can also benefit by profiling a requesting device or system. As used herein, the term "requesting system" can be interpreted to encompass all of the hardware and/or software between a requesting user and the CDN. Therefore, a requesting system may include a client device operated by the user, a local area network, such as a Wi-Fi network, through which the client device connects to the Internet, an Internet service provider (ISP), a transport network, a Tier 1 network, and/or the like, all of which can be considered part of a requesting system.

Figure 9:
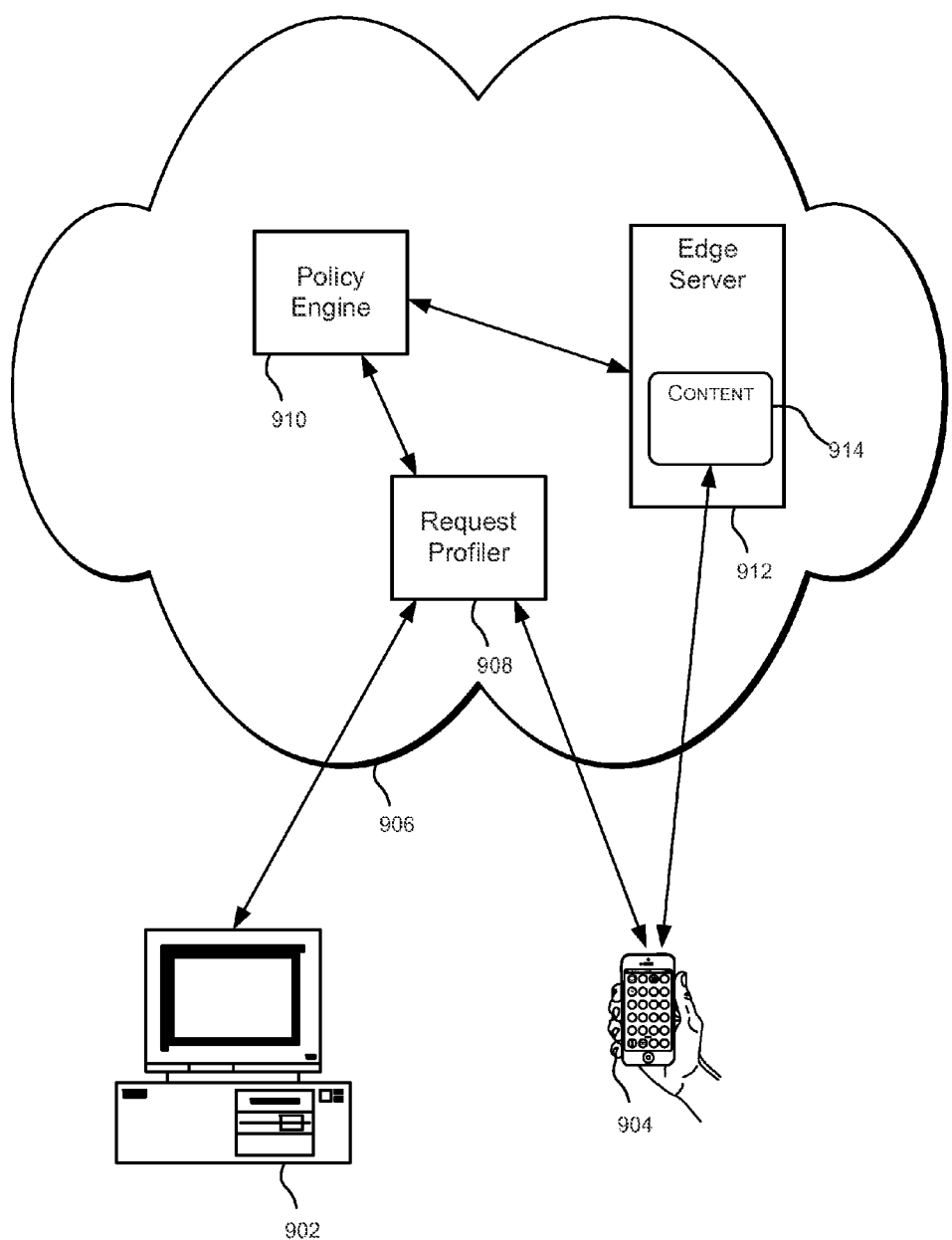
FIG. 9 illustrates a diagram of content delivery based on requesting system profiles, according to some embodiments.

FIG. 9 illustrates a diagram of content delivery based on requesting system profiles, according to some embodiments. In some embodiments, the CDN can receive a request for content 914 from a requesting system. Each such request can be analyzed by a request profiler 908. The request profiler can exist in a POP 906 of the CDN. The request profiler 908 may be implemented using a software process operating on a server, such as an edge server, a load balancer, or specialized request profiling server. The request profiler 908 may be configured to generate or match a profile for the requesting system. For example, the request profiler 908 may be configured to receive information from portions of the requesting system, such as an IP address, a device configuration, a device name, a browser name, a router ID, a source network name, and/or the like. This information may be received as part of the content request. Additionally, information may be gleaned by the request profiler 908 by explicitly requesting such information from the requesting system. The request profiler 908 can query any portion of the requesting system and gain information such as a memory size, a CPU processing power, a screen size, a bandwidth, a network latency, and/or the like. Alternatively or additionally, the request profiler 908 can store information from a certain requesting system to be retrieved when that requesting system is recognized as the source of a content request. For example, the CDN can store a profile of requesting system characteristics that can be matched to the current content request.

In some embodiments, the CDN can receive predefined profiles from a customer or from an administrator of the CDN. In this case, the request profiler 908 can gather information from and/or about the requesting system and match that information to a predefined requesting system profile. For example, a customer may specify a first profile for systems that have less memory, smaller screen size, less processing power, slower latency, less bandwidth, antiquated devices, outdated software versions, and/or the like. The customer may also specify a second profile for systems that have comparably more memory, larger screen sizes, more processing power, less latency, more bandwidth, more modern devices, updated software versions, and/or the like. The request profiler 908 can then analyze the information known about the requesting system and match the requesting system with the best fitting profile. Some profile factors, such as bandwidth, processing power, and/or screen size, can be weighted more heavily when determining a best fit for a requesting system.

It should be noted that the factors described above for the first profile and the second profile are merely exemplary and not meant to be limiting. Any number of profiles may exist, each of which may define any of the characteristics of a requesting system described herein. For example, in FIG. 9, a desktop system 902 may fit a first profile, while a mobile device 904 connecting through mobile network may fit a second profile. Although not shown, a second mobile device that is older than mobile device 904 may fit a third profile. In light of this disclosure, one having skill in the art could adapt the characteristics of a requesting system described herein with a profile depending on the needs of the particular embodiment.

Once a profile for a requesting system is selected or defined, the profile can be sent to a policy engine 910. The policy engine 910 can be configured to receive policies from a customer or from an administrator of the CDN and to determine how content is stored by the CDN and/or delivered to client devices. A policy can determine where a content request can be serviced, such as which edge server will provide the content 914 to the requesting system. Policies can also be used to determine how many copies are stored within the cache, cache expiration times, cache storage locations, formatting, partial object caching policies, different transcodings for the content 914, encryption and security policies, delivery routes, delivery latency, delivery bandwidth, and/or the like.

Some embodiments may define special delivery policies that describe specifically how the particular content 914 should be delivered based on an identified or selected requesting system profile. Generally, older client devices with lower bandwidth, less memory or processing power, outdated software versions, or communicating through slower networks with longer latency routes require more resources by the CDN in order to deliver an expected quality of service (QoS). In comparison, modern client devices with updated software, more processing power and memory that communicate through high-speed low-latency networks require less resources by the CDN in order to deliver the same QoS level. A customer whose content is stored and distributed by the CDN can specify policies that determine a level of the CDN resources that should be used to deliver content to each profile. The customer can then minimize the cost to the CDN that is passed on to the customer for requesting system profiles that are not deemed as important.

For example, a customer of the CDN may store their content on the CDN, and through an analysis of their digital presence, the customer may realize that although older systems (e.g. smart phones that are one or two generations old) cost more for content delivery, the majority of their content requests come from such older systems. Therefore, the customer may define a policy to be executed by the policy engine 910 that instructs the CDN to deliver content to older systems using more CDN resources in order to ensure a high QoS level. This may result in a higher cost to the CDN and thus a higher storage and delivery charge that is passed on to the customer. However, the customer can tailor the policies to deliver content to the right customer profiles while minimizing the costs. In another example, a customer may determine that most content requests come from new systems for which the delivery cost of the CDN is much less. In this case, the customer may change their profile to drastically reduce the amount of resources used by the CDN to deliver content to older systems. Although this may result in a lower QOS level to the older systems, the cost trade-off may be advantageous to the customer.

Figure 10:
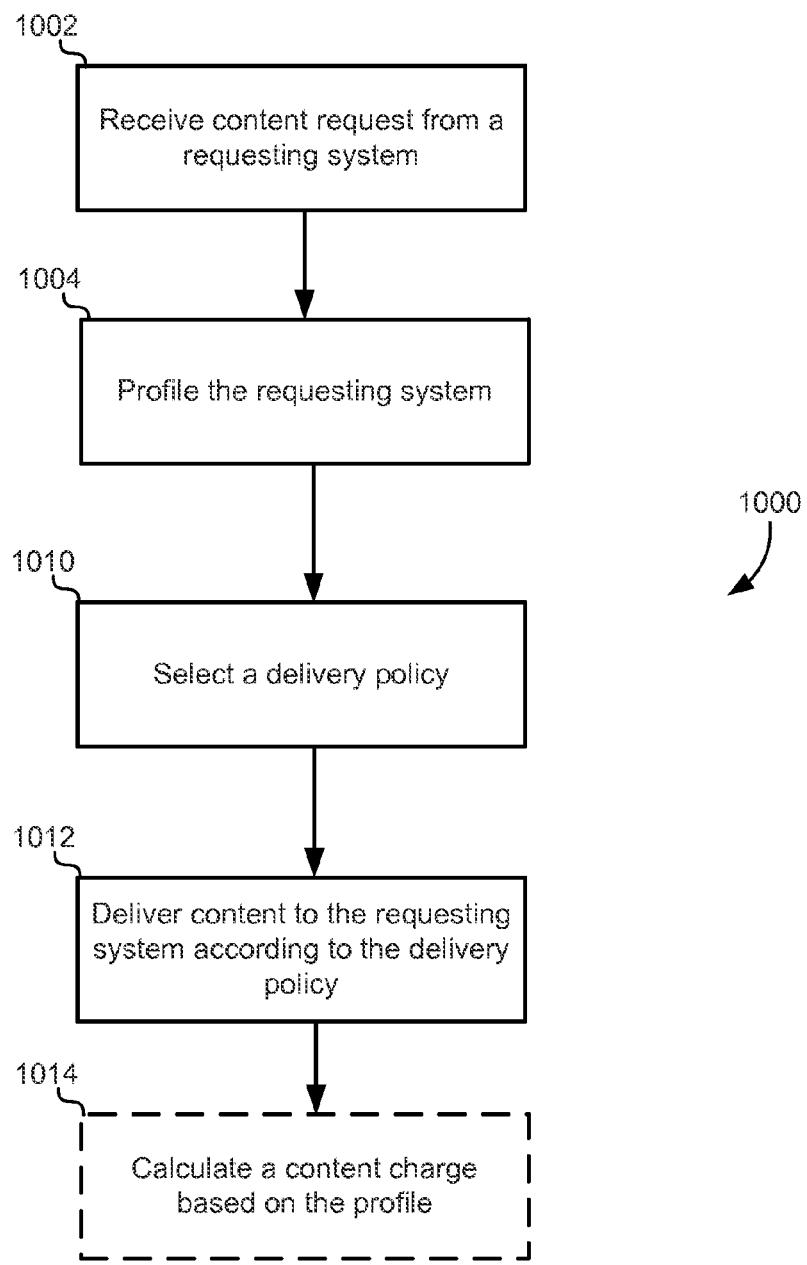
FIG. 10 illustrates a flowchart of a method for delivering content according to a requesting system profile and a predefined policy, according to some embodiments.

FIG. 10 illustrates a flowchart 1000 of a method for delivering content according to a requesting system profile and a predefined policy, according to some embodiments. The steps of this method may be carried out as described above. The method may first include receiving a content request from a requesting system (1002). The request may be received by any component in the CDN and passed to a request profiler. The method may also include profiling the requesting system (1004). This may include analyzing characteristics of the requesting system, retrieving stored information about the requesting system, querying the requesting system for additional information, and testing aspects of the requesting system, such as latency, frame size, bandwidth, and/or the like. Profiling the requesting system may also include defining a new profile or selecting an existing profile from a plurality of profiles stored in a profile database.

The method may additionally include selecting a delivery policy (1010). The delivery policy may be defined by a content provider or customer of the CDN. Alternatively, the delivery policy may be defined by the CDN by default. The delivery policy may govern which CDN resources are used in delivering the requested content as well as how much of the selected resources are used to deliver the requested content. Policies may also be dynamic in that they change based on current load measurements of the CDN and bandwidth availability. For instance, some resources may cost more during high-bandwidth intervals, and less during low bandwidth intervals. Therefore, policies may be configured to determine CDN resource usage based on a cost that will apply to the customer at the moment the content is delivered.

The method may further include delivering the content to the requesting system according to the delivery policy (1012).

The method may also include calculating a content charge based on the profile (1014). The content charge can be calculated based on the content, the requesting device profile, the delivery policy corresponding to the requesting device profile, and/or the CDN resources used during delivery. In some cases, the customer can be charged a baseline amount for content delivery, and any additional CDN resources required by the delivery policy can incur extra fees to the customer. For example, CDN resources such as additional transcodings, additional copies stored in the cache, higher bandwidth connections, preferred delivery statuses, and/or the like, can each incur an additional charge to the customer.

It should be appreciated that the specific steps illustrated in FIG. 10 provide particular methods of delivering content according to requesting system profiles and delivery policies according to various embodiments. Other sequences of steps may also be performed according to alternative embodiments. For example, alternative embodiments of the present invention may perform the steps outlined above in a different order. Moreover, the individual steps illustrated in FIG. 10 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 11:
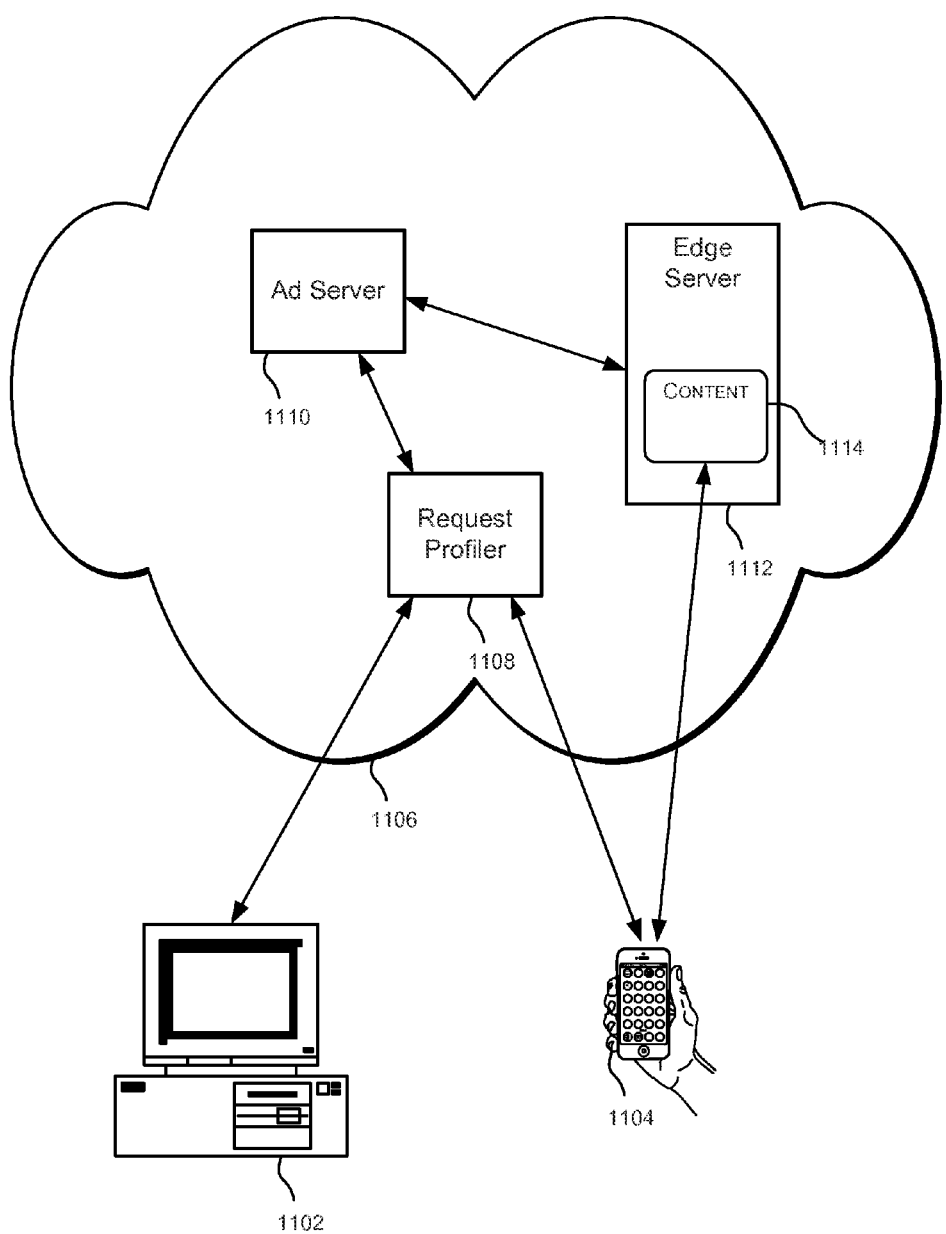
FIG. 11 illustrates a diagram of an advertisement delivery within a CDN, according to some embodiments.

FIG. 11 illustrates a diagram of an advertisement delivery within a CDN, according to some embodiments. Similar to the content delivery embodiments described above, advertisement delivery options can also be governed by a requesting system profile and an advertisement policy. Once a requesting system, such as a system including a desktop computer 1102 or a system including a mobile device 1104 is matched to a requesting system profile by the request profiler 1108, the requesting system profile can be transmitted to an ad server 1110. In some embodiments, the ad server 1110 may be administered by a third party, such that the CDN sends a request to the ad server 1110 and receives advertisements therefrom. In other embodiments, the ad server 1110 can be administered as part of the CDN within a first POP 1106.

The ad server 1110 can be configured to administer advertisement policies that are similar to content delivery policies as described above. An advertisement policy can generally select a type or cost of advertisement to be delivered to a requesting system based on the requesting system profile. Generally, an advertisement that costs the CDN less to deliver to a requesting system can be considered more lucrative to the CDN. The revenue generated by an ad is offset by the cost to the CDN to deliver the ad. When the cost of delivery advertisement can be minimized, the revenue to the CDN or to the customer can be maximized. Therefore, an advertisement policy can distribute advertisements to requesting systems in conjunction with the content delivery policy in order to maximize revenues for the CDN and/or the customer. For example, in the example described above where older systems that incur the most delivery costs also account for the majority of the customer's content traffic, more expensive advertisements can be distributed to these devices in order to offset the cost to the CDN and/or the customer.

Figure 12:
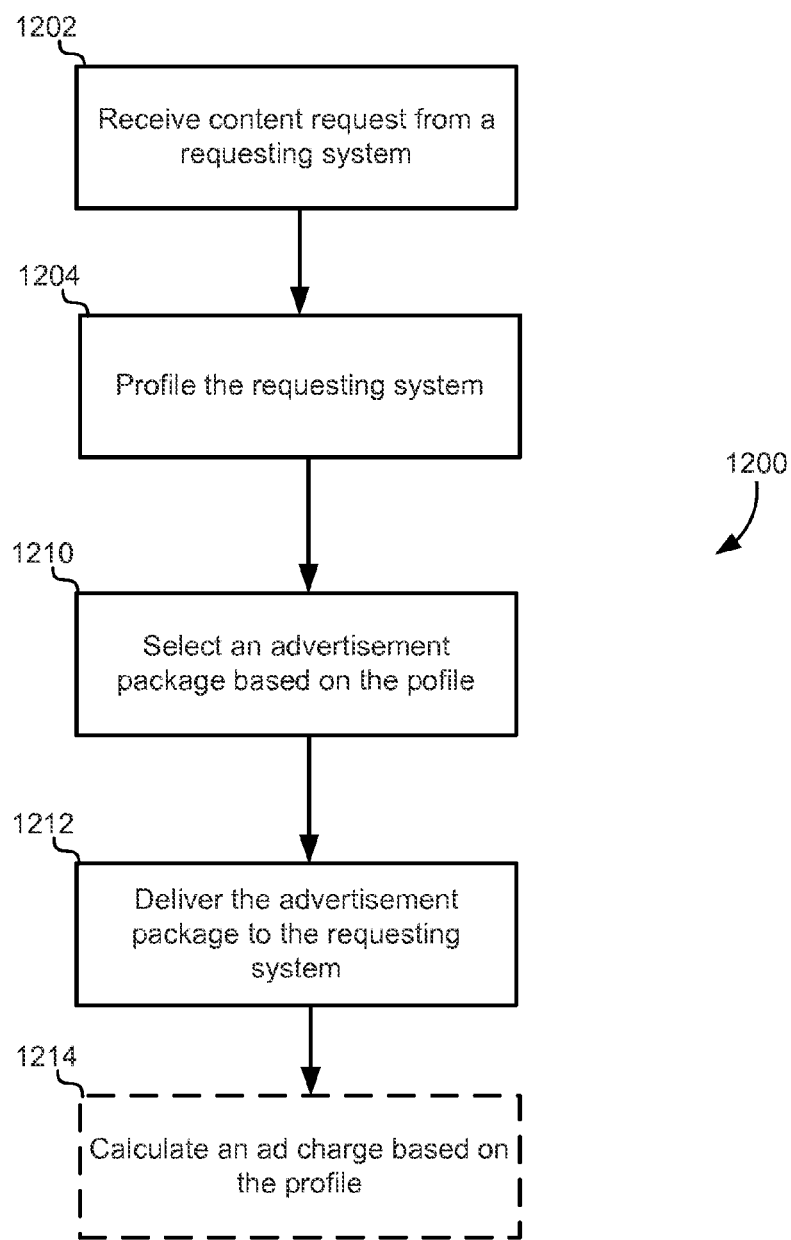
FIG. 12 illustrates a flowchart of a method for delivering advertisement packages based on requesting system profiles and advertisement policies, according to some embodiments.

FIG. 12 illustrates a flowchart 1200 of a method for delivering advertisement packages based on requesting system profiles and advertisement policies, according to some embodiments. The method may include receiving a content request from a requesting system (1202) and profiling the requesting system (1204) as described in detail above. The method may also include selecting an advertisement package based on the profile (1210). As with selecting a content delivery profile, selecting an advertisement package may be based on an advertisement profile that is specific to a particular customer, to a particular type of content, or defined by the CDN. In some embodiments, the advertisement package may be selected in order to maximize revenues and minimize cost to the CDN and/or the customer based on factors such as CDN resources used to deliver the advertisement package, cost of the advertisement package, and revenues generated when a user clicks on advertisements in the advertisement package. Advertisement package may include one or more advertisements, such as video clips, banner ads, audio files, and/or the like.

The method may further include delivering the advertisement package to the requesting system (1212). Delivering advertising package may operate in conjunction with delivering requested content. For example, an advertisement video may be appended to the beginning of a playback of requested video content, or a banner advertisement can be placed next to a requested PDF displayed on a device screen. Additionally, the method may include calculating an advertisement charge based on the requesting system profile (1214). The advertisement charge may represent revenues generated by the advertisement, or a net cost to either an administrator of the advertisement server or the customer.

It should be appreciated that the specific steps illustrated in FIG. 12 provide particular methods of delivering advertising packages according to requesting system profiles and advertisement policies according to various embodiments. Other sequences of steps may also be performed according to alternative embodiments. For example, alternative embodiments of the present invention may perform the steps outlined above in a different order. Moreover, the individual steps illustrated in FIG. 12 may include multiple sub-steps that may be performed in various sequences as appropriate to the individual step. Furthermore, additional steps may be added or removed depending on the particular applications. One of ordinary skill in the art would recognize many variations, modifications, and alternatives.

Exemplary Hardware

Figure 13:
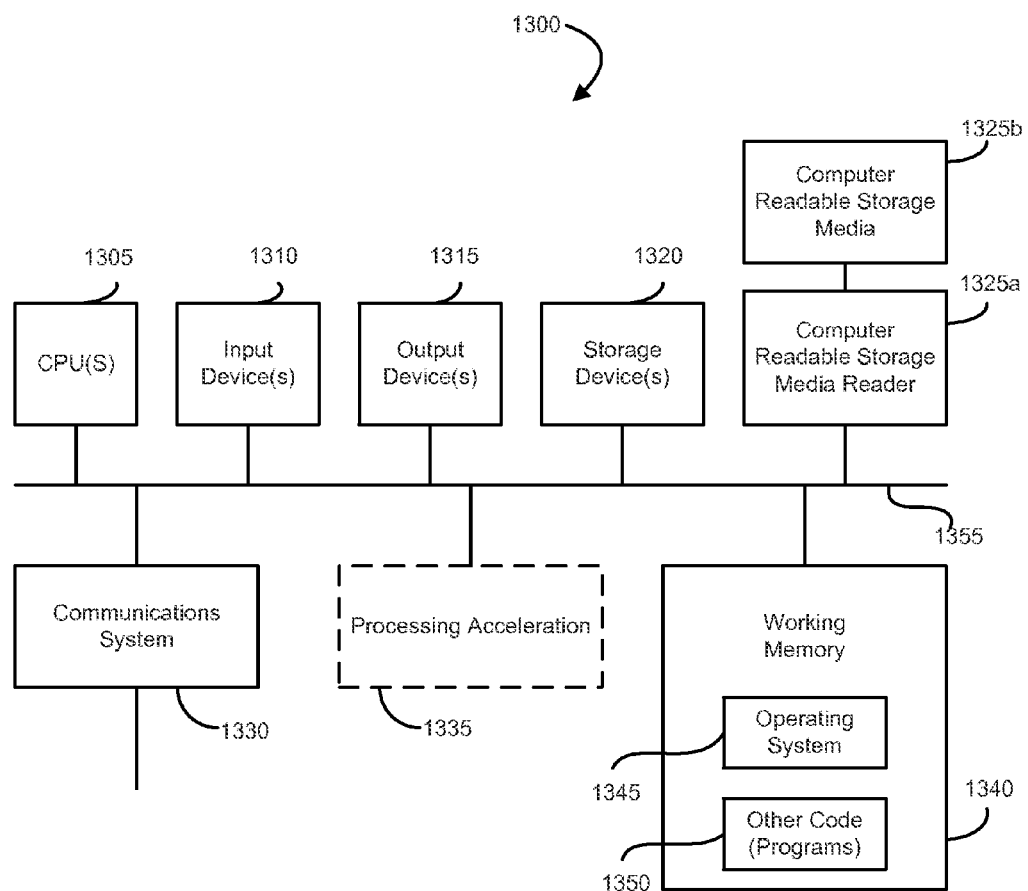
FIG. 13 illustrates one example of a computer system, according to some embodiments.

FIG. 13 illustrates an exemplary computer system 1300, in which various embodiments of the present invention may be implemented. The system 1300 may be used to implement any of the computer systems described above. The computer system 1300 is shown comprising hardware elements that may be electrically coupled via a bus 1355. The hardware elements may include one or more central processing units (CPUs) 1305, one or more input devices 1310 (e.g., a mouse, a keyboard, etc.), and one or more output devices 1315 (e.g., a display device, a printer, etc.). The computer system 1300 may also include one or more storage device 1320. By way of example, storage device(s) 1320 may be disk drives, optical storage devices, solid-state storage device such as a random access memory ("RAM") and/or a read-only memory ("ROM"), which can be programmable, flash-updateable and/or the like.

The computer system 1300 may additionally include a computer-readable storage media reader 1325a, a communications system 1330 (e.g., a modem, a network card (wireless or wired), an infra-red communication device, etc.), and working memory 1340, which may include RAM and ROM devices as described above. In some embodiments, the computer system 1300 may also include a processing acceleration unit 1335, which can include a DSP, a special-purpose processor and/or the like.

The computer-readable storage media reader 1325a can further be connected to a computer-readable storage medium 1325b, together (and, optionally, in combination with storage device(s) 1320) comprehensively representing remote, local, fixed, and/or removable storage devices plus storage media for temporarily and/or more permanently containing computer-readable information. The communications system 1330 may permit data to be exchanged with the network 1320 and/or any other computer described above with respect to the system 1300.

The computer system 1300 may also comprise software elements, shown as being currently located within a working memory 1340, including an operating system 1345 and/or other code 1350, such as an application program (which may be a client application, web browser, mid-tier application, RDBMS, etc.). It should be appreciated that alternate embodiments of a computer system 1300 may have numerous variations from that described above. For example, customized hardware might also be used and/or particular elements might be implemented in hardware, software (including portable software, such as applets), or both. Further, connection to other computing devices such as network input/output devices may be employed. Software of computer system 1300 may include code 1350 for implementing embodiments of the present invention as described herein.

Each of the methods described herein may be implemented by a computer system, such as computer system 1300 in FIG. 13. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed by the computed without human intervention. Therefore, it will be understood in light of this disclosure, that each step and each method described herein may be altered to include an input and output to and from a user, or may be done automatically by a computer system. Furthermore, some embodiments of each of the methods described herein may be implemented as a set of instructions stored on a tangible, non-transitory storage medium to form a tangible software product.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but can have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data. A processing function may include any hardware processing element, such as a server, a processor, a microcontroller, and/or the like.

While the principles of the disclosure have been described above in connection with specific apparatuses and methods, it is to be clearly understood that this description is made only by way of example and not as limitation on the scope of the disclosure.

What is claimed is:

1. A system for generating and delivering highlight versions of content for special case delivery through a Content Delivery Network (CDN), the system comprising:
   a plurality of edge servers that store and distribute content in response to user requests, wherein:
      the plurality of edge servers are organized into a plurality of geographically distributed Points of Presence (POPs) in the CDN;
      the plurality of geographically distributed POPs comprise a first POP; and
      the first POP stores first content;
   a network interface that receives requests from user devices for content, wherein a request for the first content is received and directed to the first POP;
   a processing function in the first POP configured to:
      automatically determine that the request for the first content originated from a mobile device; and
      in response to the determination that the request for the first content originated from the mobile device, provide a limited portion of the first content to the mobile device, wherein:
         the limited portion of the first content comprises less than the first content; and
         the limited portion of the first content is designated based on preferences provided by a content owner or an analysis of historical interactions between user devices and the first content.

2. The system for generating and delivering highlight versions of content for special case delivery through the CDN of claim 1, wherein the processing function is further configured to:
   provide a link with the limited portion of the first content, wherein the link allows the mobile device to request the first content after the limited portion of the first content has been viewed or played by the mobile device; and
   receive a request for the first content via the link.

3. The system for generating and delivering highlight versions of content for special case delivery through the CDN of claim 2, wherein the processing function is further configured to provide an advertisement to be displayed on the mobile device after the limited portion of the first content has been displayed by the mobile device and before the first content is displayed by the mobile device.

4. The system for generating and delivering highlight versions of content for special case delivery through the CDN of claim 1, wherein the limited portion of the first content comprises a compilation of non-contiguous segments of the first content.

5. The system for generating and delivering highlight versions of content for special case delivery through the CDN of claim 1, wherein the limited portion of the first content comprises one or more portions of the first content that have been identified as being the most popular.

6. The system for generating and delivering highlight versions of content for special case delivery through the CDN of claim 1, wherein the processing function is further configured to provide an indication to the mobile device that the limited portion of the first content is a subset of the first content.

7. A method for generating and delivering highlight versions of content for special case delivery through a Content Delivery Network (CDN), the method comprising:
   storing and distributing content in response to user requests using a plurality of edge servers, wherein:
      the plurality of edge servers are organized into a plurality of geographically distributed Points of Presence (POPs) in the CDN;
      the plurality of geographically distributed POPs comprise a first POP; and
      the first POP stores first content;
   receiving a request for the first content through a network interface that receives requests from user devices for content;
   directing the request for the first content to the first POP;
   automatically determining, using a processing function, that the request for the first content originated from a mobile device; and
   in response to the determination that the request for the first content originated from the mobile device, providing a limited portion of the first content to the mobile device, wherein:
      the limited portion of the first content comprises less than the first content and
      the limited portion of the first content is designated based on preferences provided by a content owner or an analysis of historical interactions between user devices and the first content.

8. The method for generating and delivering highlight versions of content for special case delivery through the CDN of claim 7, further comprising:
   providing a link with the limited portion of the first content, wherein the link allows the mobile device to request the first content after the limited portion of the first content has been viewed or played by the mobile device; and
   receiving a request for the first content via the link.

9. The method for generating and delivering highlight versions of content for special case delivery through the CDN of claim 8, further comprising providing an advertisement to be displayed on the mobile device after the limited portion of the first content has been displayed by the mobile device and before the first content is displayed by the mobile device.

10. The method for generating and delivering highlight versions of content for special case delivery through the CDN of claim 7, wherein the limited portion of the first content comprises a compilation of non-contiguous segments of the first content.

11. The method for generating and delivering highlight versions of content for special case delivery through the CDN of claim 7, wherein the limited portion of the first content comprises one or more portions of the first content that have been identified as being the most popular.

12. The method for generating and delivering highlight versions of content for special case delivery through the CDN of claim 7, further comprising providing an indication to the mobile device that the limited portion of the first content is a subset of the first content.

* * * * *